Figure 1:
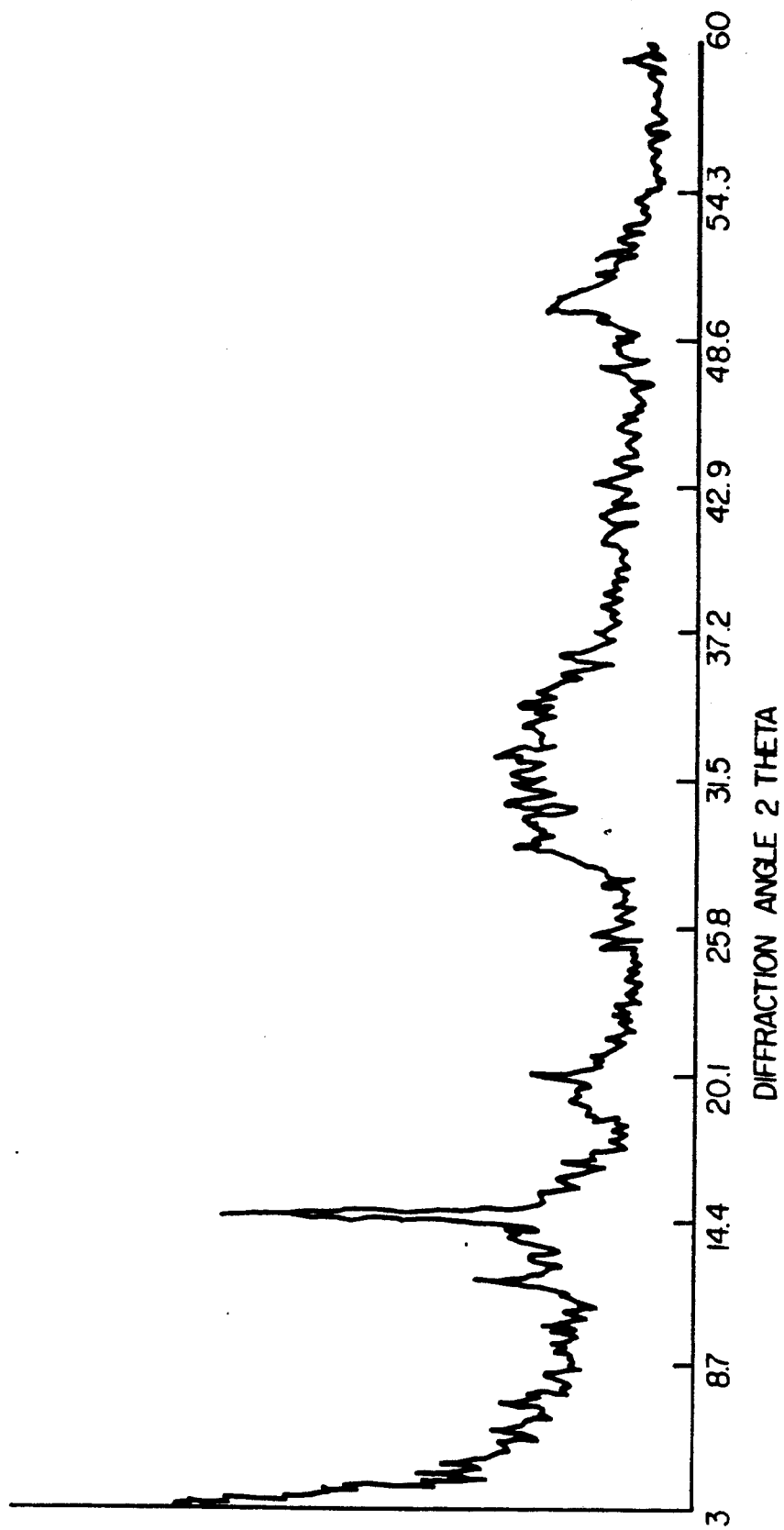

United States Patent [19]

Luciani et al.

[11] Patent Number: 5,270,275
[45] Date of Patent: Dec. 14, 1993

[54] SOLID COMPONENT OF CATALYST FOR THE HOMO- AND CO-POLYMERIZATION OF ETHYLENE

[75] Inventors: Luciano Luciani, Ferrara; Federico Milani, Rovigo; Maddalena Pondrelli, Bologna; Italo Borghi, Ferrara; Renzo Invernizzi, Milan, all of Italy

[73] Assignee: Ecp Enichem Polimeri S.R.L., Milan, Italy

[21] Appl. No.: 773,435

[22] Filed: Oct. 9, 1991

[30] Foreign Application Priority Data

Oct. 11, 1990 [IT] Italy .................. 21712 A/90

[51] Int. Cl.$^5$ ............................... C08F 4/60
[52] U.S. Cl. .......................... 502/116; 502/115; 502/117; 502/119; 502/128
[58] Field of Search ............ 502/115, 116, 117, 119, 502/128

[56] References Cited

U.S. PATENT DOCUMENTS 4,508,843 4/1985 Etherton et al. ............. 502/116

FOREIGN PATENT DOCUMENTS 0020808 1/1981 European Pat. Off. .
0204340 12/1986 European Pat. Off. .
0209104 1/1987 European Pat. Off. .
2742585 3/1978 Fed. Rep. of Germany .

*Primary Examiner*—Patrick P. Garvin
*Assistant Examiner*—Brent M. Peebles
*Attorney, Agent, or Firm*—Oblon, Spivak, McClelland, Maier & Neustadt

[57] ABSTRACT

A solid component of catalyst for the (co)polymerization of ethylene, including magnesium, halogen and titanium, is prepared:

(i) by dissolving a magnesium dialkyl, a silicon halide and at times also an alkyl halide, in an inert organic solvent and maintaining contact until a granular solid precipitates;

(ii) putting this granular solid in contact and making it react with a titanium halide, alkoxide or halogen-alkoxide, to produce a solid component of catalyst; and (iii) activating this solid component of catalyst by contact with aluminium alkyl halide, if a titanium alkoxide or halogen-alkoxide has been used in phase (ii).

24 Claims, 2 Drawing Sheets

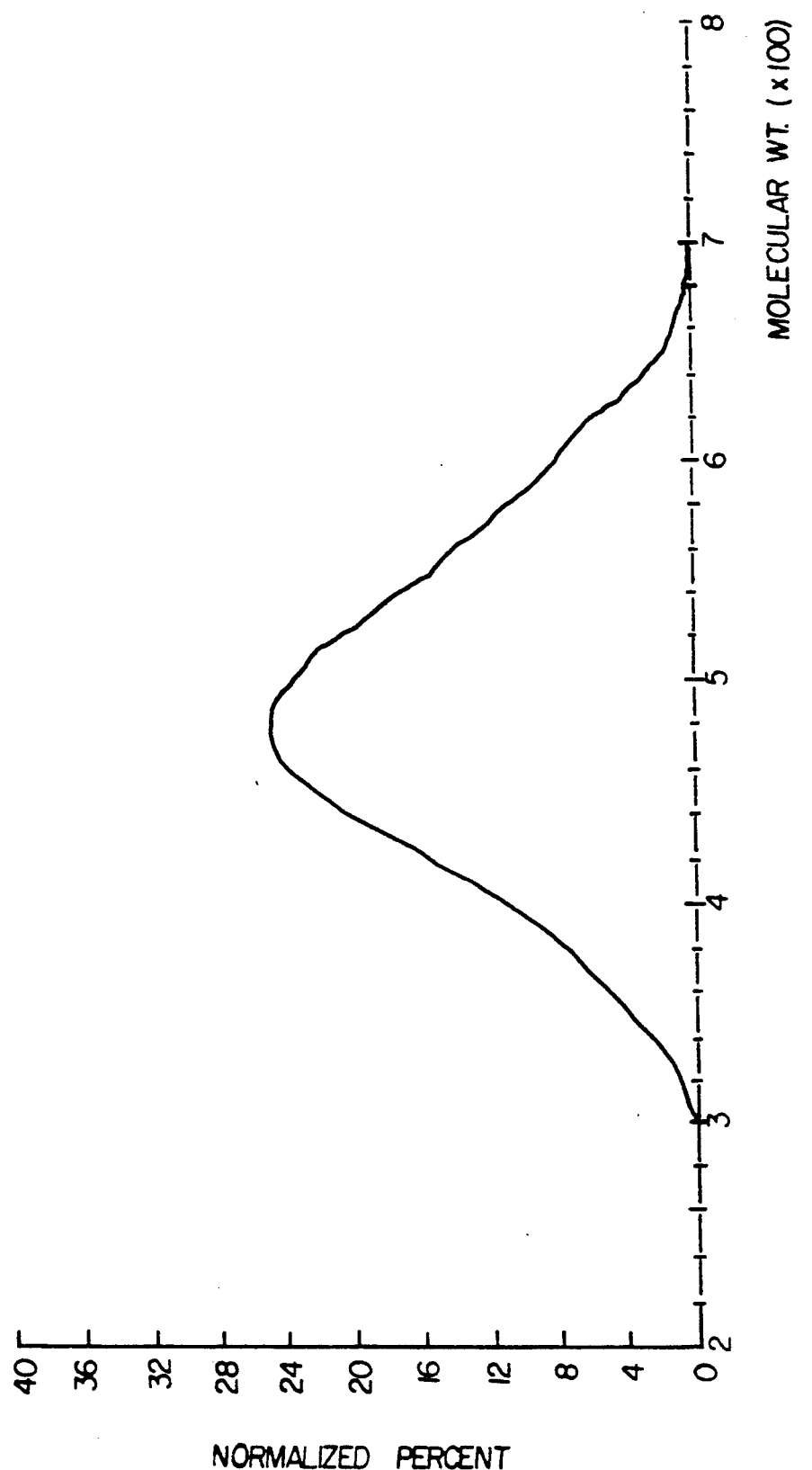

SOLID COMPONENT OF CATALYST FOR THE HOMO- AND CO-POLYMERIZATION OF ETHYLENE

The present invention concerns a solid catalytic component which, combined with metal alkyls or metal alkyl halides, produces a catalytic system suitable for the homo-polymerization of ethylene or the co-polymerization of ethylene with alpha-olefins, such as propylene, butene-1, hexene-1, 4-methyl-pentene-1, octene-1 and other similar products.

Catalytic systems of the Ziegler-Natta type are already known in the art, for the polymerization of alpha-olefins, and are generally composed of a combination of an organometallic compound of the elements in groups I to III of the periodic table and a compound of a transition metal belonging to groups IV to VI of the periodic table (Boor Jr., "Ziegler-Natta Catalysts and Polymerization", Academic, New York, 1979). Generally, the organometallic compound used is an aluminium alkyl and the transition metal compound is a titanium halide. The possibility of binding or laying this titanium halide on a solid, granular carrier, is also known (Karol F. J., Catal. Rev. - Sci. Eng., 26, 384, 557-595, 1984).

Also known is the activation of the magnesium chloride and its use in the preparation of catalysts based on highly active titanium salts in the polymerization of olefins, as described in Germany 2.153.520 (CA 77, 62505, 1972); Germany 2.638.429 (CA 83, 59870, 1972); Germany 2.638.429 (CA 86, 140706, 1975); Belgium 848.427 (CA 87, 68839, 1977); and Japan 79.118.484 (CA 92, 59450, 1979). It is finally known that heterogeneous catalysts for the polymerization of alpha-olefins are capable of reproducing their morphology in an equivalent polymeric morphology; this is made possible by applying technological conditions of catalyst synthesis which can be both complicated and onerous (Karol F. J., mentioned above, and McDaniel M. P., J. Polym. Chem. Ed., 19, 1967-1976, 1981).

The polyolefin market is demanding more and more products which are able to satisfy the most varied requirements of application whereas, on the other hand, there is also the need to simplify the production processes of polyolefins, to reduce investments and production costs. The particular necessity is felt of having catalysts which are not only simple and economical, but are also able to produce, if possible in a single polymerization phase, olefinic homo-polymers and co-polymers which are suitable for both extrusion and moulding.

Eaborn C. E. in "Organo Silicon Compounds", Butterworths Scientific Publications, London 1960; Rochow E. G. in "The Chemistry of Silicon", New York, 1975; and Voorhoeve R. J. H. in "Organosilanes", Elsevier, New York, 1967, describe an alkylation reaction between a magnesium dialkyl (MgR,) or a magnesium alkyl halide (MgRX) and silicon tetrachloride (SiCl₄), which produces a solid non crystalline compound, according to the reaction:

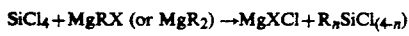

$$SiCl_4 + MgRX \text{ (or } MgR_2) \rightarrow MgXCl + R_nSiCl_{(4-n)}$$

It has now been discovered, according to the present invention, that this precipitate can be obtained by using a particle size specifically regulated in relation to the ratio between the reagents. It has also been discovered that the precipitate thus obtained is able to react with a titanium compound to produce a solid component of catalyst which is extremely active in the (co)polymerization of ethylene, and in which the ratio between titanium in its tetravalent state and titanium in its trivalent state is related to the ratio between silicon and magnesium in the solid. It has finally been discovered that the addition of a metal compound chosen from vanadium, zirconium and hafnium, in the precipitation phase of the solid, allows solid components of catalyst to be obtained, which can produce polyethylenes having a wider distribution of molecular weight, in a single polymerization stage. It is therefore possible, according to the present invention, to obtain in an easy and convenient way, catalysts which are capable of producing polyethylenes with various characteristics, using simplified polymerization processes, thus eliminating, or at least reducing, the disadvantages involved in the known technique described above.

In accordance with this, one aspect of the present invention concerns a solid component of catalyst for the (co)polymerization of ethylene, including magnesium, halogen and titanium, obtained by:

(i) dissolution, in an inert, organic solvent, of a magnesium dialkyl, a silicon halide and at times also an alkyl halide, with an atomic ratio between the silicon, in the silicon halide, and the magnesium, in the magnesium dialkyl, ranging from 0.5/1 to 15/1, and with a molar ratio between the alkyl halide and silicon halide ranging from 0/1 to 10/1, maintaining contact until a granular solid precipitates from the solution;

(ii) contact of the above granular solid and reaction with a titanium halide, alkoxide or halogen-alkoxide, with an atomic ratio between the magnesium, in the granular solid, and the titanium, in the titanium compound, ranging from 1/1 to 60/1, to form a solid component of catalyst, and (iii) activation of the solid component of catalyst by contact with an aluminium alkyl halide, only when a titanium alkoxide or halogen-alkoxide has been used in stage (ii).

In one of the methods used, measured quantities of at least one compound of a metal M chosen from vanadium, zirconium and hafnium, are additionally added to the solution in phase (i), to obtain solid components of catalyst which are suitable for the production of polymers and copolymers of ethylene having a wide distribution of molecular weight.

In stage (i) of the present invention, a granular solid is precipitated from a solution, in an inert organic solvent, of a magnesium dialkyl, a silicon chloride and at times also an alkyl halide.

Silicon halides suitable for this purpose are silicon chlorides and bromides and chloro and bromo silanes. Specific examples of these compounds are silicon tetrachloride, silicon tetrabromide, trichlorosilane, vinyl trichlorosilane, trichloroethoxy silane and chloroethyl trichlorosilane. It is preferable to use silicon tetrachloride. The alkyl halides which are suitable for the purpose are alkyl chlorides and bromides, either primary, secondary or tertiary, where the alkyl group contains from 1 to 20 carbon atoms. Specific examples of alkyl halides are, ethyl bromide, butyl chloride, hexyl chloride, octyl chloride and cyclohexyl chloride. Magnesium dialkyls suitable for the purpose are compounds which can be defined by the formula MgR'R", where R' and R", either the same or different, each stand independently for an alkyl group, either linear or branched, containing from 1 to 10 carbon atoms. Specific examples of magnesium dialkyls are: magnesium diethyl, magnesium ethyl butyl, magnesium dihexyl, maganesium butyl octyl, and magnesium dioctyl. The solvents used for dissolving the above-mentioned compounds are liquid organic solvents in the operating conditions and also inert (non reactive) with respect to the other components. Examples of suitable solvents are hydrocarbons, particularly aliphatic hydrocarbons, such as pentane, isopentane, hexane, heptane and octane.

Stage (i) may be carried out by preparing a solution of magnesium dialkyl, silicon halide and possibly alkyl halide in the organic solvent chosen, operating at room temperature (20°-25° C.) or approximately room temperature, with such quantities of the relative compounds as to have an atomic ratio between the silicon and magnesium ranging from 0.5/1 to 15/1 and a molar ratio between the alkyl halide and silicon halide ranging from 0/1 to 10/1. The solution thus obtained is then heated to a temperature ranging from 40° to 100° C. causing the precipitation of a granular solid. In practice, operating under the conditions specified above, almost complete precipitation occurs after a period of from 0.5 to 5 hours approx. Operating conditions in the preferred method are with an atomic ratio between the silicon and magnesium in the initial solution ranging from 1/1 to 9/1 and a molar ratio between the alkyl halide and silicon halide ranging from 0/1 to 5/1, the solution is heated to a temperature which ranges from 70° to 95° C. for a period of 1-2 hours. The solid thus obtained is in granular form with a limited particle size. More specifically, it has been discovered that more than 95% of the solid has a particle size ranging from 1 to 50 μm, and more than 90% a granulometry ranging from 2 to 40 μm. It has also been discovered that, in the above-mentioned range, the value of apparent density of the polymers obtained depends on the ratio between silicon and magnesium in the starting solution, in that higher ratio values correspond to a higher apparent density. The alkyl halide, which is an optional component in stage (i), basically has the effect of facilitating the chlorination of the magnesium alkyl.

The granular solid precipitated in stage (i) is separated from the liquid phase and thoroughly washed with an inert liquid solvent, particularly a hydrocarbon solvent, such as hexane or heptane.

In stage (ii), the solid obtained above, is put in contact and made to react with a titanium compound chosen from titanium halides, alkoxides and halogen-alkoxides. Specific examples of these compounds are: titanium tetrachloride, titanium tetrabromide, titanium tetra-n-propylate, titanium tetra-n-butylate, titanium tetra-i-propylate, titanium tetra-i-butylate and the corresponding titanium mono- or di-chloro alkoxides and mono- or di-bromo alkoxides. Mixtures of two or more of the above-mentioned titanium compounds may be used.

Stage (ii) may be carried out by suspending the granular solid in an inert organic solvent, for example a hydrocarbon solvent, of the aliphatic type, such as hexane, heptane, octane etc., and adding the titanium compound, possibly dissolved in the same or similar solvent, to the suspension. In particular, the quantity of the titanium compound should be such as to have an atomic ratio between the magnesium, in the granular solid, and the titanium, in the titanium compound, ranging from 1/1 to 60/1, preferably from 4/1 to 20/1. The suspension thus obtained is kept at a temperature ranging from 50° to 100° C., preferably from 60° to 90° C. over a period of from 0.5 to 5 hours, preferably around 1-2 hours. A solid component of catalyst is thus obtained, which can be recovered from the relative suspension, for instance by evaporating the organic solvent either at atmospheric or reduced pressure.

When a titanium alkoxide or halogen-alkoxide is used in stage (ii), the solid component of catalyst should undergo activation treatment. This activation is carried out in a further stage (iii), by putting the component in contact at the end of stage (ii) with an aluminium alkyl halide. Aluminium alkyl halides suitable for the purpose are aluminium alkyl chlorides or bromides, such as diethyl aluminium chloride or bromide, ethyl aluminium sesquichloride or bromide, and diisobutyl aluminium chloride or bromide. More specifically, the solid component of catalyst, suspended in an inert organic solvent, such as a hydrocarbon solvent, of the aliphatic type, for example hexane or heptane, is put in contact with an aluminium alkyl halide, with a ratio between the halogen atoms, in the aluminium alkyl halide, and the alkoxy groups, in the titanium alkoxide or halogen-alkoxide, ranging from 0.1/1 to 10/1 and the suspension is kept at a temperature ranging from 10° to 100° C. for a period of from 10 minutes to 5 hours. At the end of the treatment, the solid component of catalyst can be recovered from the suspension, for example by filtration, is washed with a hydrocarbon solvent and, if desired, dried.

When a titanium tetrahalide is used in stage (ii), the component of catalyst obtained at the end of this stage generally contains 0.5-10% by weight of titanium, 10-30% by weight of magnesium and 50-75% by weight of halogen. When a titanium alkoxide or halogen-alkoxide is used in stage (ii), the solid component of catalyst obtained at the end of stage (iii) may contain in addition small quantities of aluminium and alkoxide groups.

The interaction mechanism between the titanium compound and the granular solid in stage (ii) of the procedure is not very clear, and in particular it is not known whether the interaction is physical, chemical or both. Whatever the case may be, if the operating conditions described above are applied, a component of catalyst is obtained in the form of a granular solid with a particle size similar to that of the solid obtained in the precipitation stage (i), capable of producing polymers having an apparent density which, depending on the specific conditions used, ranges from 0.25 to 0.40 g/ml, normally about 0.30-0.35 g/ml. This granular solid has a pour rate which is lower than 30 sec.(ASTM 1895). Moreover, the titanium in the solid component of catalyst at the end of stage (ii) can be substantially in a tetravalent form, or partially in a trivalent form and partially in a tetravalent form, depending in particular on the ratio between magnesium and silicon in the solid obtained at the end of stage (i). More specifically, with higher values of this ratio, the formation of trivalent titanium is more likely, whereas lower values favour the formation of tetravalent titanium. The degree of oxidation of the titanium can be further varied in the method which includes stage (iii). In fact, in this phase there is a reduction to the lower state of oxidation, together with an increase in the halogen content and either partial or total elimination of the alkoxy groups present in the solid component of catalyst. It is therefore possible, according to the present invention, to obtain solid components of catalyst with the desired degree of oxidation of the titanium, suitable for the production of polyethylenes having a distribution of the molecular weight from narrow to average.

When polyethylenes having a wider distribution of molecular weight are required, at least one compound of a metal M chosen from vanadium, zirconium and hafnium is added to the solution in stage (i). Suitable compounds for the purpose are halides, oxyhalides, alkoxides and halogen alkoxides, preference being given to halides, such as vanadium trichloride and tribromide, zirconium tetrachloride and tetrabromide and hafnium tetrachloride and tetrabromide. In this method, the atomic ratio between the magnesium, in the magnesium dialkyl, and the total amount of titanium and metal or metals M, ranges from 1/1 to 30/1 and the atomic ratio between the titanium and the metal or metals M from 0.1/1 to 2/1. In the preferred method, the atomic ratio between magnesium and the total amount of titanium and metal(s) M is kept at a value ranging from 1/1 to 9/1 and the atomic ratio between titanium and metal(s) M from 0.5/1 to 1/1.

The mechanism with which the compound of the metal M interacts with the other components in phase (i) of the procedure is not entirely clear. It is thought, however, that the interaction involves a reduction of the metal M by the magnesium dialkyl. For example the solid component of catalyst, obtained in experimental example 6, when submitted to X ray analysis, the spectrum of which is shown in FIG. 1, shows its characteristic peak of HfCl at approx. 10° C. and that of HfCl$_4$ at approx. 15° and 20° C. This proves that the solid component of catalyst contains a mixture of mono and tetravalent Hf, with tri and tetravalent Ti, in the presence of MgCl$_2$ in delta form. In any case, at the end of phase (i) a granular solid is obtained with a particle size of the granules very similiar to that obtained without the compound of metal M, which is suitable for reacting with the titanium compound in the following phase (ii). It is also thought that in phase (ii) redox reactions occur between the titanium and the metal M, thus allowing a further diversification of the active catalytic centres present in the solid component of catalyst. This diversification can be further increased by using more metals M and/or in the optional carrying out of phase (iii) of the procedure, as previously specified. In any case, solid components of catalysts are obtained which are highly active in the (co)polymerization of ethylene and which are capable of producing polyethylene having a wider distribution of molecular weight, operating in a single polymerization process. It should be pointed out that polymers having a wide distribution of molecular weight have a monomodal distribution which makes them easier to mould and extrude as compared to those having a bimodal distribution. FIG. 2 enclosed shows the distribution of molecular weight of the polymer prepared in experimental example 6. In addition, in the copolymerization of ethylene with an alpha-olefin, copolymers are obtained with a homogeneous distribution of the comonomer in the polymer chain.

The present invention also concerns catalysts for the (co)polymerization of ethylene, composed of the solid component of catalyst described above, combined with an organometallic compound of aluminium (co-catalyst) which can be chosen from aluminium trialkyls and aluminium alkyl halides (particularly chlorides), containing from 1 to 6 carbon atoms in the alkyl section. Among these, aluminium trialkyls are preferred, such as aluminium triethyl, aluminium tributyl, aluminium triisobutyl and aluminium trihexyl. In the catalysts of the present invention, the atomic ratio between the aluminium (in the co-catalyst) and the titanium (in the solid component of catalyst) generally ranges from 0.5:1 to 1.000:1, preferably from 50:1 to 200:1.

These catalysts are extremely active in procedures for the polymerization of ethylene and copolymerization of ethylene with alpha-olefins and can be used in polymerization processes carried out by means of the suspension technique in an inert diluent or using the method of the gas phase, in a fluidized or stirred bed. The alpha-olefins which can be copolymerized are generally those containing from 3 to 15 carbon atoms, such as butene-1, hexene-1, 4-methyl-pentene-1, octene-1, undecene-1,1,4-hexadiene and ethylidine norbornene. The general polymerization conditions are: temperature from 50° to 100° C., total pressure from 5 to 40 bar, with a ratio between the partial pressures of hydrogen and ethylene ranging from 0 to 10. The catalysts of the present invention are sensitive to the polymerization temperature and the kind of co-catalyst used. For example, it is possible to obtain a marked increase in the MFR value of the polyethylenes when, under the same operating conditions, the polymerization temperature is lowered. It has also been discovered that an aluminium alkyl co-catalyst with a higher alkyl (for example aluminium trihexyl) gives a better constancy of polymerization kinetics and an increase in the MFR value of the polyethylenes produced, compared to polymerizations carried out with an aluminium alkyl co-catalyst with a lower alkyl (such as aluminium triisobutyl). These observations allow the polymerization to be regulated according to the final products desired.

In any event, there is a high yield in the olefinic polymer, and the polymer thus obtained has excellent rheological properties and, in particular, is in the form of non-friable granules of which more than 95% by weight have a size distribution ranging from 250 to 1000 μm and are without fines.

The experimental samples which follow provide a better illustration of the present invention.

EXAMPLE 1

200 ml of a 20% solution by weight of magnesium butyl octyl (Mg$_1$But$_{1.5}$Ott$_{0.5}$; 29.16 g, 175 mmoles) and 202 ml of silicon tetrachloride (297 g, 1750 mmoles) in n-heptane are charged, in a nitrogen atmosphere, into a 500 ml flask equipped with a reflux cooler, mechanical stirrer and thermometer. The mixture is heated to 77° C. for 1 hour. The solid precipitate in granules of from 1 to 50 um, is separated by filtration and thoroughly washed with n-heptane. The washed solid is suspended in 150 ml of n-heptane and 1.43 g (7.5 mmoles) of titanium tetrachloride are added to the suspension. Contact is maintained for 1 hour at 90° C. and the suspension is then dried by evaporating the solvent at atmospheric pressure. 17 g of a solid component of catalyst are thus obtained in granules whose size is similar to those of the solid precipitate, containing 0.9% by weight of titanium (in the form of tetravalent titanium), 24.3% by weight of magnesium and 66.8% by weight of chlorine.

The solid component of catalyst prepared in the above way, is used in a test for the polymerization of ethylene. More specifically, the polymerization is carried out in a 5 liter autoclave, containing 2 litres of n-hexane, using 50 mg of the solid component of catalyst and 4 mmoles of aluminium triethyl as cocatalyst.

The solid component of catalyst is charged into the reaction vessel, under hydrogen at atmospheric pressure and at a temperature of 30° C. The reaction vessel is brought to the required operating conditions, in 30 minutes, by feeding ethylene and hydrogen up to a total pressure of 15 bar (ratio between hydrogen pressure and ethylene pressure of 0:47/1) and raising the temperature to 90° C. Polymerization is continued under these conditions for 60 minutes.

A yield equal to 9.0 kg of polyethylene per gram of solid component of catalyst is thus obtained and the polyethylene has the following characteristics:

| | |
|---|---|
| density: (ASTM D-1505) | 0.9570 g/ml |
| MFI (2.16 kg): (Melt-Flow Index - ASTM D-1238) | 0.38 g/10' |
| apparent density: (ASTM D-1895) | 0.36 g/ml |
| MFR: | 33.8 |

(MFR = Melt-Flow Index Ratio, defined as a ratio MFI (21.6 kg)/MFR (2.16 kg).

The polyethylene is also in granule form with the following size distribution in μm:

| | |
|---|---|
| >2000 | 0.0% by weight |
| 2000< >1000 | 0.5% by weight |
| 1000< >500 | 62.7% by weight |
| 500< >125 | 35.7% by weight |
| <125 | 1.1% by weight |

EXAMPLE 2

The same procedure is carried out as in Example 1, with the difference that 20.2 ml (29.66 g, 175 mmoles) of silicon tetrachloride are used.

17 g of a solid component of catalyst in granule form, containing 1.4% by weight of titanium (42% in trivalent form), 22.6% by weight of magnesium and 62.5% by weight of chlorine, are thus obtained.

The solid component of catalyst prepared in the above way is used in a test for the polymerization of ethylene carried out as described in Example 1. A yield of 6.2 kg of polyethylene per gram of solid component of catalyst is obtained and the polyethylene has the following characteristics:

| | |
|---|---|
| density: | 0.9531 g/ml |
| MFI (2.16 kg): | 0.08 g/10' |
| apparent density: | 0.29 g/ml |
| MFR: | 47.6 |
| size distribution (μm): | |
| >2000 | 0.1% by weight |
| 2000< >1000 | 15.3% by weight |
| 1000< >500 | 55.2% by weight |
| 500< >125 | 28.9% by weight |
| <125 | 0.5% by weight |

EXAMPLE 3

100 ml of n-heptane, 48 ml of a 20% by weight solution of magnesium butyl octyl (Mg$_1$But$_{1.5}$Oct$_{0.5}$; 7.0 g, 42 mmoles) and 17 ml of silicon tetrachloride (25 g, 147 mmoles) in n-heptane are charged, in a nitrogen atmosphere, into a 250 ml flask equipped with a reflux cooler, mechanical stirrer and thermometer. The contents of the flask are heated to 90° C. for 1 hour. The solid precipitate in granules of from 1 to 50 um, is separated by filtration and thoroughly washed with n-hexane. The washed solid is suspended in 100 ml of n-hexane and 1.22 g (3.6 mmoles) of titanium tetra-n-butylate are added. Contact is maintained for 1 hour at 65° C. and the suspension is then dried by evaporating the solvent at a pressure of 10 mm Hg. 4.5 g of a solid is obtained, which is suspended in 50 ml of n-hexane and 3.9 ml of a 40% by weight solution of aluminium ethyl sesquichloride (1.31 g, 5.3 mmoles) in decane are added to the suspension. Contact is maintained for 15 minutes at 25° C. and the solid is then recovered by filtration, washed with n-hexane and dried by evaporating the solvent.

The solid component of catalyst thus obtained, has a particle size similar to that of the solid precipitate and contains 3.2% by weight of titanium, 19.4% by weight of magnesium, 58.1% by weight of chlorine, 8.9% by weight of butanol and 0.6% by weight of aluminium.

A test for the polymerization of ethylene is carried out as described in Example 1, using 40 mg of the solid component of catalyst and 5.0 mmoles of aluminium triethyl as cocatalyst.

A yield of 11.4 kg of polyethylene per gram of solid component of catalyst is obtained and the polyethylene has the following characteristics:

| | |
|---|---|
| density: | 0.9581 g/ml |
| MFI (2.16 kg): | 0.48 g/10' |
| apparent density: | 0.27 g/ml |
| MFR: | 30.9 |
| size distribution (μm): | |
| >2000 | 0.4% by weight |
| 2000< >1000 | 15.1% by weight |
| 1000< >500 | 74.6% by weight |
| 500< >125 | 9.1% by weight |
| <125 | 0.8% by weight |

EXAMPLE 4

The same procedure is carried out as in Example 3, with the difference that 6 ml (5.32 g, 67.8 mmoles) of butylchloride are added together with the silicon tetrachloride. A solid component of catalyst is obtained, containing 2.6% by weight of titanium, 20.0% by weight of magnesium, 58.1% by weight of chlorine, 8.0% by weight of butanol and 1.3% by weight of aluminium.

A test for the polymerization of ethylene is carried out with the same procedure described in Example 1, using 50 mg of the solid component of catalyst and 6 mmoles of aluminium triethyl as cocatalyst. A yield of 13.1 kg of polyethylene per gram of solid component of catalyst is thus obtained and the polyethylene has the following characteristics:

| | |
|---|---|
| density: | 0.9574 g/ml |
| MFI (2.16 kg): | 0.38 g/10' |
| apparent density: | 0.28 g/ml |
| MFR: | 11.8 |
| size distribution (μm): | |
| >2000 | 8.7% by weight |
| 2000< >1000 | 64.7% by weight |
| 1000< >500 | 22.6% by weight |
| 500< >125 | 3.1% by weight |
| <125 | 0.9% by weight |

EXAMPLE 5

100 ml of n-heptane, 10.2 ml of a 20% by weight solution of magnesium butyl octyl (Mg1But1.50ct0.5; 1.49 g, 8.9 mmoles), 6.8 ml of silicon tetrachloride (9.98 g, 58.8 mmoles) and 4.6 ml (4.08 g, 44.0 mmoles) of butylchloride in n-heptane are charged, in a nitrogen atmosphere, into a 250 ml flask equipped with a reflux cooler, mechanical stirrer and thermometer. The contents of the flask are heated for 2 hours to a temperature of 90° C. 6.8 ml (9.98 g, 58.8 mmoles) of silicon tetrachloride and 4.6 ml (4.08 g, 44.0 mmoles) of butylchloride are again added and the mixture is kept for 2 hours at a temperature of 90° C. The solid precipitate in granules of from 1 to 50 μm, is separated by filtration and thoroughly washed with n-hexane. The washed solid is suspended in 50 ml of n-hexane and 2.55 g (7.5 mmoles) of titanium tetra-n-butylate are added to the suspension. Contact is maintained for 1 hour at 65° C. and the suspension is then dried by evaporating the solvent at a pressure of 10 mm Hg. 2.1 g of a solid are obtained, which are suspended in 20 ml of n-hexane, and 3.4 ml of a 40% by weight solution of aluminium ethyl sesquichloride (0.99 g, 4.0 mmoles) in decane are added to the resulting suspension. Contact is maintained for 14 minutes at 25° C. and the solid is then recovered by filtration, washed with n-hexane and dried by evaporating the solvent.

A component of catalyst is obtained in granules whose size is similar to that of the solid precipitate, and is used in a test for the polymerization of ethylene with the same procedure described in Example 4.

A yield of 12.1 kg of polyethylene per gram of solid component of catalyst is obtained and the polyethylene has the following characteristics:

| density | 0.9591 g/ml |
|---|---|
| MFI (2.16 kg): | 1.7 g/10' |
| apparent density: | 0.30 g/ml |
| MFR: | 25.6 |
| size distribution (μm): | |
| >2000 | 5.4% by weight |
| 2000< >1000 | 15.0% by weight |
| 1000< >500 | 46.6% by weight |
| 500< >125 | 26.4% by weight |
| <125 | 6.6% by weight |

EXAMPLE 6

114 ml of a 20% by weight solution of magnesium butyl octyl ($Mg_1But_{1.5}Oct_{0.5}$) and 8.0 g (25.0 mmoles) of hafnium tetrachloride in n-heptane are charged, in a nitrogen atmosphere, into a 500 ml flask equipped with a reflux cooler, mechanical stirrer and thermometer. The contents of the flask are heated for 15 minutes to 40° C., and 100 ml (147 g, 864 mmoles) of silicon tetrachloride are added and the mixture heated for 1 hour to 77° C. The solid precipitate in granules of from 1 to 50 μm, is separated by filtration and thoroughly washed with n-heptane. The washed solid is suspended in 150 ml of n-heptane and 2.8 ml (4.84 g, 25.5 mmoles) of titanium tetrachloride are added to the suspension. Contact is maintained for 1 hour at 90° C. and the suspension is then dried by evaporating the solvent at atmospheric pressure.

20 g of a solid component of catalyst are thus obtained, in granules whose size distribution is similar to that of the solid precipitate, and containing, in addition to the hafnium, 5.0% by weight of titanium (93% in the form of trivalent titanium), 11.1% by weight of magnesium and 57.1% by weight of chlorine.

The solid component of catalyst prepared in the above way, is used in a test for the polymerization of ethylene. More specifically, the polymerization is carried out in a 5 liter autoclave, containing 2 litres of n-hexane, using 50 mg of the solid component of catalyst and 5 mmoles of aluminium triisobutyl as cocatalyst, operating with a total pressure of 15 bar (ratio between the hydrogen pressure and ethylene pressure of 1.2/1), at a temperature of 85° C. and over a period of 1.5 hours.

A yield equal to 8.1 kg of polyethylene per gram of solid component of catalyst is obtained and the polyethylene has the following characteristics:

| density: | 0.9565 g/ml |
|---|---|
| MFI (2.16 kg): | 0.14 g/10' |
| apparent density: | 0.28 g/ml |
| MFR: | 76.4 |
| size distribution (μm): | |
| <2000 | 0.0% by weight |
| 2000< >1000 | 1.0% by weight |
| 1000< >500 | 47.7% by weight |
| 500< >125 | 50.5% by weight |
| <125 | 0.8% by weight |

EXAMPLE 7

The solid component of catalyst obtained according to the procedure described in Example 6, is used in a further test for the polymerization of ethylene in a 5 liter autoclave, containing 2 litres of n-hexane, using 50 mg of the solid component of catalyst and 5 mmoles of aluminium triisobutyl as cocatalyst, operating with a total pressure of 15 bar (ratio between the hydrogen pressure and the ethylene pressure of 0.94/1), at a temperature of 80° C., over a period of 4 hours.

A yield equal to 12.1 kg of polyethylene per gram of solid component of catalyst is obtained and the polyethylene has the following characteristics:

| density: | 0.9562 g/ml |
|---|---|
| MFI (2.16 kg): | 0.09 g/10' |
| apparent density: | 0.28 g/ml |
| MFR: | 83 |
| size distribution (μm): | |
| >2000 | 0.1% by weight |
| 2000< >1000 | 1.2% by weight |
| 1000< >500 | 60.7% by weight |
| 5000< >125 | 37.6% by weight |
| <125 | 0.4% by weight |

EXAMPLE 8

The solid component of catalyst obtained according to the procedure described in Example 6, is used in a further test for the polymerization of ethylene in a 5 liter autoclave, containing 2 liters of n-hexane, using 50 mg of the solid component of catalyst and 4 mmoles of aluminium trihexyl as cocatalyst, operating with a total pressure of 15 bar (ratio between the hydrogen pressure and the ethylene pressure of 1.17/1), at a temperature of 85° C., over a period of 2 hours.

A yield equal to 9.0 kg of polyethylene per gram of solid component of catalyst is obtained and the polyethylene has the following characteristics:

| density: | 0.9579 g/ml |
|---|---|
| MFI (2.16 kg): | 0.33 g/10' |
| apparent density: | 0.26 g/ml |
| MFR: | 87.5 |
| size distribution (μm): | |
| >2000 | 0.1% by weight |
| 2000< >1000 | 0.8% by weight |

| | |
|---|---|
| 1000< >500 | 53.9% by weight |
| 500< >125 | 44.7% by weight |
| <125 | 0.5% by weight |

EXAMPLE 9

The solid component of catalyst obtained according to the procedure described in Example 6, is used in a further test for the polymerization of ethylene in a 5 liter autoclave, containing 2 liters of n-hexane, using 50 mg of the solid component of catalyst and 4 mmoles of aluminium trihexyl as cocatalyst, operating with a total pressure of 15 bar (ratio between the hydrogen pressure and the ethylene pressure of 1/1), at a temperature of 85° C., over a period of 2 hours.

A yield equal to 10.5 kg of polyethylene per gram of solid component of catalyst is obtained and the polyethylene has the following characteristics:

| | |
|---|---|
| density: | 0.956 g/ml |
| MFI (2.16 kg): | 0.21 g/10' |
| apparent density: | 0.2 g/ml |
| MFR: | 102 |
| size distribution (μm): | |
| >2000 | 0.1% by weight |
| 2000< >1000 | 0.9% by weight |
| 1000< >500 | 54.2% by weight |
| 500< >125 | 44.3% by weight |
| <125 | 0.5% by weight |

EXAMPLE 10

The solid component of catalyst obtained according to the procedure described in Example 6, is used in a further test for the polymerization of ethylene in a 5 liter autoclave, containing 2 liters of n-hexane, using 50 mg of the solid component of catalyst and 5 mmoles of aluminium triisobutyl as cocatalyst, operating with a total pressure of 15 bar (ratio between the hydrogen pressure and the ethylene pressure of 1.8/1), at a temperature of 75° C., over a period of 4 hours.

A yield equal to 9.0 kg of polyethylene per gram of solid component of catalyst is obtained and the polyethylene has the following characteristics:

| | |
|---|---|
| density: | 0.9581 g/ml |
| MFI (2.16 kg): | 0.11 g/10' |
| apparent density: | 0.29 g/ml |
| MFR: | 117 |
| size distribution (μm): | |
| >2000 | 0.1% by weight |
| 2000< >1000 | 1.2% by weight |
| 1000< >500 | 55.2% by weight |
| 500< >125 | 42.9% by weight |
| <125 | 0.6% by weight |

EXAMPLE 11

A solid component of catalyst is prepared according to the procedure described in Example 6, with the difference that 4.0 g (12.5 mmoles) of hafnium tetrachloride and 1.4 ml (2.42 g, 12.8 mmoles) of titanium tetrachloride are used. 15.5 g of a solid component of catalyst are thus obtained, containing in addition to the hafnium, 3.6% by weight of titanium (88% in the form of trivalent titanium), 14.6% by weight of magnesium and 56.9% by weight of chlorine.

The solid component of catalyst prepared in the above way, is used in a test for the co-polymerization of ethylene. More specifically, the co-polymerization is carried out in a 5 liter autoclave, containing 2 litres of n-hexane and 10 g of butene-1 as comonomer, using 60 mg of the solid component of catalyst and 4 mmoles of aluminium triisobutyl as cocatalyst, operating with a total pressure of 15 bar (ratio between the hydrogen pressure and the ethylene pressure of 1.35/1), at a temperature of 85° C., over a period of 1.5 hours.

A yield equal to 8.3 kg of copolymer ethylene-butene-1 per gram of solid component of catalyst is obtained and the copolymer thus obtained has the following characteristics:

| | |
|---|---|
| density: | 0.9494 g/ml |
| MFI (2.16 kg): | 0.24 g/10' |
| apparent density: | 0.28 g/ml |
| MFR: | 73.3 |
| size distribution (μm): | |
| >2000 | 0.0% by weight |
| 2000< >1000 | 0.1% by weight |
| 1000< >500 | 17.2% by weight |
| 500< >125 | 77.9% by weight |
| <125 | 4.8% by weight |

EXAMPLE 12

The solid component of catalyst obtained according to the procedure described in Example 11, is used in a further test for the copolymerization of ethylene in a 5 liter autoclave, containing 2 litres of n-hexane and 10 g of butene-1 as comonomer, using 30 mg of the solid component of catalyst and 4 mmoles of aluminium triisobutyl as cocatalyst, operating with a total pressure of 15 bar (ratio between the hydrogen pressure and the ethylene pressure of 1.54/1), at a temperature of 85° C., over a period of 4 hours.

A yield equal to 6.2 kg of copolymer ethylene-propylene per gram of solid component of catalyst is obtained and the copolymer thus obtained has the following characteristics:

| | |
|---|---|
| density: | 0.9525 g/ml |
| MFI (2.16 kg): | 1.32 g/10' |
| apparent density: | 0.275 g/ml |
| MFR: | 50.2 |
| size distribution (μm): | |
| <2000 | 0.0% by weight |
| 2000< >1000 | 0.1% by weight |
| 1000< >500 | 13.9% by weight |
| 500< >125 | 83.7% by weight |
| <125 | 2.3% by weight |

EXAMPLE 13

A solid component of catalyst is prepared according to the procedure described in Example 6, but with the difference that 4.0 g (12.5 mmoles) of hafnium tetrachloride are used. 16 g of a solid component of catalyst are obtained, containing, in addition to the hafnium, 4.7% by weight of titanium (74.5% in the form of trivalent titanium), 13.7% by weight of magnesium and 56.9% by weight of chlorine.

The solid component of catalyst prepared in the above way, is used in a test for the polymerization of ethylene. More specifically, the polymerization is carried out in a 5 liter autoclave, containing 2 liters of n-hexane, using 50 mg of the solid component of catalyst and 5 mmoles of aluminium triisobutyl as cocatalyst, operating with a total pressure of 15 bar (ratio between the hydrogen pressure and the ethylene pressure of 1.26/1), at a temperature of 85° C., over a period of 1.5 hours.

A yield equal to 7.4 kg of polyethylene per gram of solid component of catalyst is obtained and the polyethylene has the following characteristics:

| density: | 0.9581 g/ml |
| --- | --- |
| MFI (2.16 kg): | 0.27 g/10' |
| apparent density: | 0.26 g/ml |
| MFR: | 62.2 |
| size distribution (μm): | |
| >2000 | 0.1% by weight |
| 2000< >1000 | 1.7% by weight |
| 1000< >500 | 57.5% by weight |
| 500< >125 | 40.0% by weight |
| <125 | 0.7% by weight |

EXAMPLE 14

A solid component of catalyst is prepared according to the procedure described in Example 6, but with the difference that 16.0 g (50 mmoles) of hafnium tetrachloride are used. 27 g of a solid component of catalyst are obtained, containing, in addition to the hafnium, 3.9% by weight of titanium (93.5% in the form of trivalent titanium), 7.8% by weight of magnesium and 50.9% by weight of chlorine.

The solid component of catalyst prepared in the above way, is used in a test for the polymerization of ethylene. More specifically, the polymerization is carried out in a 5 liter autoclave, containing 2 litres of n-hexane, using 50 mg of the solid component of catalyst and 4 mmoles of aluminium triisobutyl as cocatalyst, operating with a total pressure of 15 bar (ratio between the hydrogen pressure and the ethylene pressure of 1.11/1), at a temperature of 85° C., over a period of 1.5 hours.

A yield equal to 2.7 kg of polyethylene per gram of solid component of catalyst is obtained and the polyethylene has the following characteristics:

| density | 0.9570 g/ml |
| --- | --- |
| MFI (2.16 kg): | 0.10 g/10' |
| apparent density: | 0.29 g/ml |
| MFR: | 81 |
| size distribution (μm): | |
| >2000 | 0.0% by weight |
| 2000< >1000 | 0.3% by weight |
| 1000< >500 | 2.3% by weight |
| 500< >125 | 82.3% by weight |
| <125 | 15.1% by weight |

EXAMPLE 15

A solid component of catalyst is prepared according to the procedure described in Example 6, but with the difference that zirconium tetrachloride (5.8 g, 25 mmoles) is used instead of hafnium tetrachloride. 19 g of a solid component of catalyst are obtained, containing, in addition to the zirconium, 4.9% by weight of titanium (93.0% in the form of trivalent titanium), 11.5% by weight of magnesium and 66.4% by weight of chlorine.

The solid component of catalyst prepared in the above way, is used in a test for the polymerization of ethylene. More specifically, the polymerization is carried out in a 5 liter autoclave, containing 2 litres of n-hexane, using 50 mg of the solid component of catalyst and 4 mmoles of aluminium triisobutyl as cocatalyst, operating with a total pressure of 15 bar (ratio between the hydrogen pressure and the ethylene pressure of 1.10/1), at a temperature of 85° C., over a period of 1.5 hours.

A yield equal to 8.4 kg of polyethylene per gram of solid component of catalyst is obtained and the polyethylene has the following characteristics:

| density: | 0.9571 g/ml |
| --- | --- |
| MFI (2.16 kg): | 0.8 g/10' |
| apparent density: | 0.29 g/ml |
| MFR: | 52.4 |
| size distribution (μm): | |
| >2000 | 0.0% by weight |
| 2000< >1000 | 1.5% by weight |
| 1000< >500 | 45.4% by weight |
| 500< >125 | 52.4% by weight |
| <125 | 0.7% by weight |

EXAMPLE 16

A solid component of catalyst is prepared according to the procedure described in Example 6, but with the difference that 3.93 g (25 mmoles) of vanadium trichloride are used instead of hafnium tetrachloride. 23.6 g of a solid component of catalyst are obtained, containing 2.8% by weight of titanium, 5.8% by weight of vanadium, 11.1% by weight of magnesium and 47.1% by weight of chlorine.

The solid component of catalyst prepared in the above way, is used in a test for the polymerization of ethylene. More specifically, the polymerization is carried out in a 5 liter autoclave, containing 2 litres of n-hexane, using 50 mg of the solid component of catalyst and 5 mmoles of aluminium triisobutyl as cocatalyst, operating with a total pressure of 15 bar (ratio between the hydrogen pressure and the ethylene pressure of 1.46/1), at a temperature of 85° C., over a period of 2 hours.

A yield equal to 6.2 kg of polyethylene per gram of solid component of catalyst is obtained and the polyethylene has the following characteristics:

| density: | 0.9635 g/ml |
| --- | --- |
| MFI (2.16 kg): | 2.82 g/10' |
| apparent density: | 0.28 g/ml |
| MFR: | 39.2 |
| size distribution (μm): | |
| >2000 | 1.3% by weight |
| 2000< >1000 | 8.2% by weight |
| 1000< >500 | 80.6% by weight |
| 500< >125 | 9.4% by weight |
| <125 | 0.5% by weight |

EXAMPLE 17

114 ml of a 20% by weight solution of magnesium butyl octyl ($MgButs_{1.5}Oct_{0.5}$), 6.0 g of a mixture of vanadium trichloride and hafnium tetrachloride, with an atomic ratio V/Hf equal to 1/1, in n-heptane, are charged in a nitrogen atmosphere, into a 500 ml flask, equipped with a reflux cooler, mechanical stirrer and thermometer. The mixture of chlorides has been previously ground for 4 hours in an argon atmosphere. The resulting suspension is heated to 40° C. for 15 minutes and 100 ml (147 g, 864 mmoles) of silicon tetrachloride are then added. The contents of the flask are heated for 1 hour to 77° C. The solid granular precipitate is separated by filtration and thoroughly washed with n-hexane. The washed solid is suspended in 150 ml of n-hexane and 2.8 M ml (4.84 g, 25.5 mmoles) of titanium tetrachloride added to the suspension. Contact is maintained for 1 hour at 90° C. and the suspension is dried by evaporating the solvent at atmospheric pressure.

21 g of a solid component of catalyst are thus obtained, containing 3.0% by weight of titanium, 3.1% by weight of vanadium, 12.5% by weight of magnesium and 52.5% by weight of chlorine.

The solid component of catalyst prepared in the above way, is used in a test for the polymerization of ethylene. More specifically, the polymerization is carried out in a 5 liter autoclave, containing 2 liters of n-hexane, using 50 mg of the solid component of catalyst and 5 mmoles of aluminium trihexyl as cocatalyst, operating with a total pressure of 15 bar (ratio between the hydrogen pressure and the ethylene pressure of 1.35/1), at a temperature of 75° C., over a period of 4 hours.

A yield equal to 8.4 kg of polyethylene per gram of solid component of catalyst is obtained and the polyethylene has the following characteristics:

| | |
|---|---|
| density: | 0.9540 g/ml |
| MFI (2.16 kg): | 0.045 g/10' |
| apparent density: | 0.28 g/ml |
| MFR: | 183 |
| size distribution (μm): | |
| >2000 | 0.1% by weight |
| 2000< >1000 | 1.2% by weight |
| 1000< >500 | 57.7% by weight |
| 500< >125 | 40.6% by weight |
| <125 | 0.4% by weight |

EXAMPLE 18

The solid component of catalyst prepared according to the procedure described in Example 6, is used in a fluidized bed polymerization reactor. The reactor consists of an 80 cm long steel tube having a diameter of 5 cm, containing a porous metal disk on the bottom to allow the gas to gurgle upwards, through the bed. 5 g of solid component of catalyst are suspended in 100 ml of isobutane and 1 ml of this suspension is charged into the reaction vessel. A solution of 50 mmoles of aluminium triisobutyl in 100 ml of isobutane is also prepared, and 10 ml are fed into the reaction vessel. A 1:1 mixture of ethylene and hydrogen is distributed in the reaction vessel with a calibrated rotameter. An automatic pressure release valve discharges part of the unreacted mixture, which leaves the reaction vessel, in such a way as to keep the pressure of the system constant at 20 bar. The mixture is recycled in the reactor by means of a compressor and is mixed with the fresh load. The recycling speed is regulated with a flow control valve to obtain an adequate fluidifying and mixing level. The temperature of the reaction vessel is fixed by passing the recycled and fresh flows through both a cooler and a heater, in order to set the temperature at the entrance to the reaction vessel. The cocatalyst solution is pumped by means of a calibrated pump through a coil in a heated bath to allow for the complete evaporation of the solution. The vapour flow is then injected into the recycled ethylene-hydrogen mixture. At the beginning of the test, 1 ml of solid component of catalyst is injected into the suspension and the flow of the ethylene-hydrogen mixture is started. When the system has become stationary, the cocatalyst is fed in and the polymerization process begins.

The duration of the test is 1.5 hours and the polymerization temperature is 75° C.

A yield of 10.5 kg of polymer per gram of solid component of catalyst is obtained and the polyethylene thus obtained has the following characteristics:

| | |
|---|---|
| density: | 0.9525 g/ml |
| MFI (2.16 kg): | 0.21 g/10' |
| apparent density: | 0.38 g/ml |
| MFR: | 107 |
| size distribution (μm): | |
| >2000 | 0.0% by weight |
| 2000< >1000 | 10.1% by weight |
| 1000< >500 | 54.9% by weight |
| 500< >125 | 35.0% by weight |
| <125 | 0.0% by weight |

We claim:

1. A solid catalyst component for the (co)polymerization of ethylene, comprising magnesium, halogen and titanium, obtained by a process comprising the steps of:
   (i) dissolving in an inert, organic solvent, a magnesium dialkyl, a silicon halide and, optionally, an alkyl halide, wherein the silicon, from the silicon halide, and the magnesium, from the magnesium dialkyl, are present in an atomic ratio of Si/Mg of from 0.5/1 to 15/1, and wherein said alkyl halide and silicon halide are present in a molar ratio of from 0/1 to 10/1, maintaining contact until a granular solid precipitates from the solution, wherein said silicon halide is selected from the group consisting of silicon tetrachloride, silicon tetrabromide, trichlorosilane, vinyltrichlorosilane, trichloroethoxysilane and chloroethyltrichlorosilane, wherein said solution is heated to a temperature of from 70° to 95° C. for a period of approximately 0.5 to 5 hours;
   (ii) contacting said granular solid with a titanium halide, alkoxide or halogen alkoxide, wherein the magnesium in the granular solid and the titanium in the titanium compound are present in an atomic ratio of from 1/1 to 60/1, to produce a solid catalyst component; and
   (iii) activating said solid catalyst component by contacting said component with an aluminum alkoyl halide, in the case that a titanium alkoxide or halogen-alkoxide is used in step (ii).

2. A catalyst component according to claim 1, wherein said silicon halide is silicon tetrachloride.

3. A catalyst component according to claim 1, wherein said alkyl halide of step (i) is selected from the group consisting of alkyl chlorides and alkyl bromides, wherein said alkyl group is primary, secondary or tertiary, and contains from 1 to 20 carbon atoms.

4. A catalyst component according to claim 3, wherein said alkyl halide is selected from the group consisting of ethyl bromide, butylchloride, hexylchloride, octylchloride and cyclohexylchloride.

5. A catalyst component according to claim 1, wherein said magnesium dialkyl of step (i) is selected from the group consisting of compounds of formula MgR'R", where R' and R" may be the same or different and are each independently a linear or branched alkyl group containing from 1 to 10 carbon atoms.

6. A catalyst component according to claim 5, wherein said magnesium dialkyl is selected from the group consisting of magnesium diethyl, magnesium ethylbutyl, magnesium dihexyl, magnesium butyloctyl, and magnesium dioctyl.

7. A catalyst component according to claim 1, wherein said inert organic solvent of step (i) is a hydrogen solvent.

8. A catalyst component according to claim 7, wherein said solvent is an aliphatic hydrocarbon.

9. A catalyst component according to claim 1, wherein said atomic ratio between silicon and magnesium ranges from 1/1 to 9/1, said molar ratio between the alkyl halide and silicon halide ranges from 0/1 to 5/1, and said solution is heated to a temperature ranging from 70° to 95° C. for a period of 1 to 2 hours.

10. A catalyst component according to claim 1, wherein said solid precipitate of step (i) is separated from the solution and is thoroughly washed with an inert liquid solvent.

11. A catalyst component according to claim 10, wherein said inert liquid wash solvent is a hydrocarbon solvent.

12. A catalyst component according to claim 11, wherein said titanium compound of step (ii) is selected from the group consisting of titanium tetrachloride, titanium tetrabromide, titanium tetra-n-propylate, titanium tetra-n-butylate, titanium tetra-i-propylate, titanium tetra-i-butylate and the corresponding titanium mono- or di-chloroalkoxides and mono- or di-boromoalkoxides.

13. A catalyst component according to claim 1, wherein said step (ii) further comprises suspending the granular solid in an inert organic solvent, at a temperature ranging from 50° to 100° C. over a period of 0.5 to 5 hours.

14. A catalyst component according to claim 1, wherein said atomic ratio between magnesium and titanium in step (ii) ranges from 4/1 to 20/1 and wherein said step (ii) is performed at an operating temperature of from 60° to 90° C. over a period of approximately 1-2 hours.

15. A catalyst component according to claim 11, wherein said component obtained at the end of step (ii) is recovered by evaporating the organic solvent at atmospheric or reduced pressure.

16. A catalyst component according to claim 1, wherein the aluminum alkyl halide of step (iii) is selected from the group consisting of aluminum alkyl chlorides and aluminum alkyl bromides, and said activation step is performed by suspending the component in an inert organic solvent, wherein the formed suspension has a ratio between halogen atoms, from the aluminum alkyl halide, and alkoxy groups, from the titanium alkoxide or halogen alkoxide, of from 0.1/1 to 10/1, at a temperature ranging from 10° to 100° C. over a period of from 10 minutes to 5 hours.

17. A catalyst component according to claim 1, wherein the component obtained at the end of step (iii) is recovered from the suspension by filtration, and is washed with hydrocarbon solvent and dried.

18. A catalyst component according to claim 1, further comprising at least one metal M selected from the group consisting of vanadium, zirconium and hafnium wherein said metal M is added as a compound of said metal M to the solution of step (i).

19. A catalyst component according to claim 10, wherein said compound of metal M is selected from the group consisting of halides, oxyhalides, alkoxides and halogen alkoxides of metal M.

20. A catalyst component according to claim 19, wherein said compound of metal M is selected from the group consisting of vanadium trichloride, vanadium tribromide, zirconium tetrachloride, zirconium tetrabromide, hafnium tetrachloride and hafnium tetrabromide.

21. A catalyst component according to claim 19, wherein said atomic ratio in step (i) between magnesium from the magnesium dialkyl, and the total of titanium and metal or metals M, is in the range of from 1/1 to 30/1, and wherein said titanium and said metal or metals M are present in an atomic ratio of from 0.1/1 to 2/1.

22. A catalyst component according to claim 21, wherein said atomic ratio of step (ii) between magnesium and the total of titanium and metal or metals M is maintained at a value ranging from 1/1 to 9/1 and said atomic ratio between titanium and metal or metals M is from 0.5/1 to 1/1.

23. A catalyst component according to claim 16, wherein said aluminum alkyl halide is selected from the group consisting of diethyl aluminum chloride, diethyl aluminum bromide, ethyl aluminum sesquichloride, diisobutyl aluminum chloride and diisobutyl aluminum bromide.

24. A catalyst for the (co)polymerization of ethylene comprising a solid catalyst component according to claim 1 and an organometallic compound of aluminum.

* * * * *